S. L. SISTI.
STORAGE AND DISPENSING VESSEL.
APPLICATION FILED JAN. 17, 1917.
1,298,108.
Patented Mar. 25, 1919.
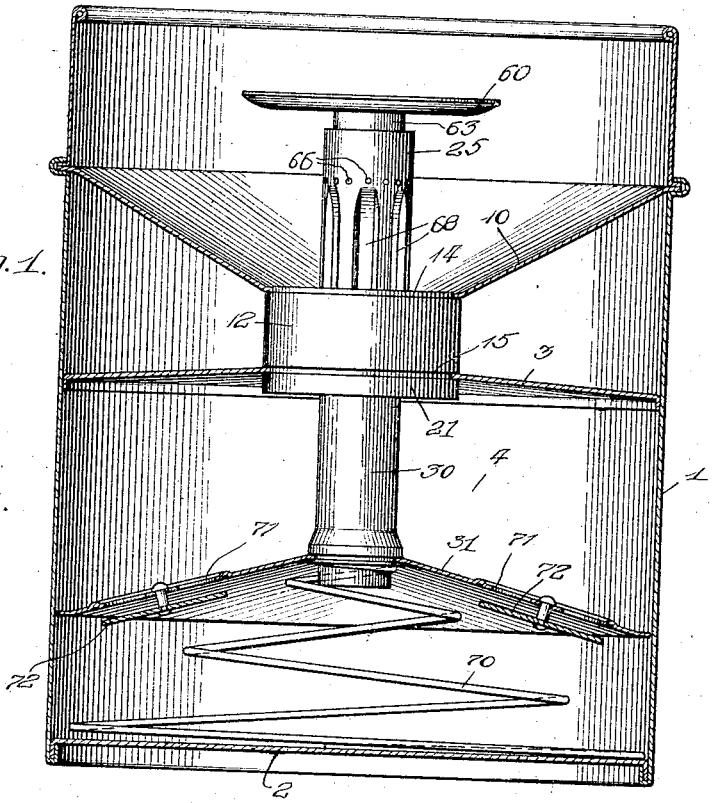
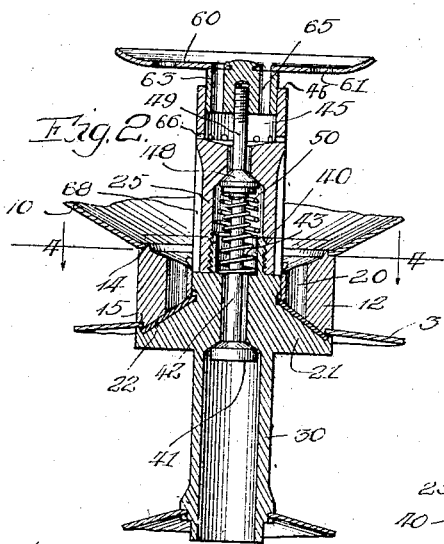
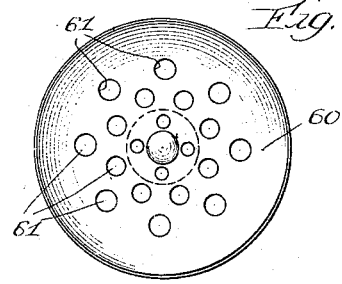
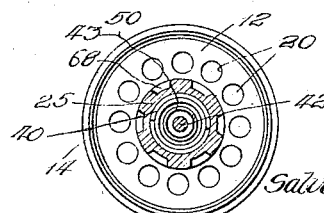
Inventor,
Salvatore Leo Sisti
By Hirschl & Hirschl
Attys

UNITED STATES PATENT OFFICE.

SALVATORE LEO SISTI, OF CHICAGO, ILLINOIS, ASSIGNOR TO SISTI SAFETY CAN COMPANY, OF CHICAGO, ILLINOIS, A CORPORATION OF ILLINOIS.

STORAGE AND DISPENSING VESSEL.

1,298,108.  Specification of Letters Patent.  Patented Mar. 25, 1919.

Application filed January 17, 1917. Serial No. 142,956.

*To all whom it may concern:*

Be it known that I, SALVATORE LEO SISTI, a subject of the King of Italy, residing in the city of Chicago, in the county of Cook and State of Illinois, have invented new and useful Improvements in Storage and Dispensing Vessels, of which the following is a specification.

This invention relates to improvements in storage and dispensing vessels and more especially to vessels of such nature adapted to contain gasolene, alcohol, turpentine and other volatile or inflammable liquids.

In many places gasolene and other inflammable and volatile liquids are kept and used occasionally in small quantities to saturate a cloth or sponge for cleaning or other purposes, and in such cases it is desirable that the main supply of the liquid be kept in a tightly sealed storage vessel or reservoir in order to minimize the loss and waste by evaporation, and the danger of fire. I have accordingly shown in by prior United States Patent No. 1,200,145, issued October 3, 1916, a storage vessel or reservoir adapted for such purpose wherein the main supply of the liquid is kept in a sealed chamber in the lower part of the vessel, and forced upward into an upper chamber by a movement of a part of the mechanism so that the liquid thus supplied and exposed in the upper chamber may be available for saturating a cloth or sponge placed in a small perforated dish in the center of the upper chamber. The present invention has for one of its objects an improvement in the device shown in such former patent, by supplying the liquid from the storage chamber in the lower part of the receptacle directly to the dispensing dish in the center of the upper chamber, to moisten or saturate a cloth or sponge as may be required, with a minimum quantity of the liquid exposed to the air, so as to lessen the danger of fire and the loss by evaporation, with the additional improvement that the liquid in the storage chamber is more securely and effectively sealed, so as to lessen the loss and waste by evaporation, and the danger by fire if the liquid is inflammable.

A device embodying the principles of the present invention is illustrated in the accompanying drawings in which Figure 1 is a view of the complete device in axial section. Fig. 2 is a similar section through the valve mechanism in the center of the device. Fig. 3 is a top plan view, showing the dispensing saucer or dish in the center of the upper chamber. Fig. 4 is a vertical section on the line 4—4 of Fig. 2.

As shown in said drawings the complete device comprises a cylindric receptacle or vessel 1 having a raised bottom 2 provided with a circular partition 3 forming below a storage chamber 4. The partition or circular wall 3 is made somewhat concave on its under surface so that the vessel may be inverted and emptied if desired through an opening in the center of the partition as will appear from the further description hereinafter, and above this partition is a funnel shaped member 10. The two disks 3 and 10 are joined at their rims to the wall of the receptacle 1 and they are made with circular openings at their centers and joined to a cylindric member 12 which may preferably be made of brass or other non-corrodible metal. The center block 12 is made with a conical depression in its upper surface to form a continuation of the surface of the funnel 10 which latter fits into a circular shoulder at the upper edge of the block 12 as indicated at 14, where it may be secured by soldering or welding. The circular disk 3 is similarly joined to the lower edge of the cylinder 12 as indicated at 15. There is thus formed between the two membrs 3 and 10 an annular air chamber insulating the storage chamber 4 from the liquid receptacle in the upper part of the device, so that in case the small amount of fluid which may be in the upper part should become ignited, the heat will not be communicated to the fluid in the lower part of the device. A circular row of holes 20 through the cylinder 12 afford communication between the upper part of the device and the lower part, these holes being normally closed by a valve constructed as follows:

The under surface of the cylinder 12 is made with a conic recess into which is fitted a cone shaped valve head 21 with a piece of leather or similar packing material 22 interposed to cover the openings 20. The valve head 21 is provided with a valve stem or plunger 25 which is free to slide upward and downward through a large opening in the center of the cylinder 12 so that when the valve is in its raised position, the valve head 21 will cover the openings 20; and by pushing the valve downward, the openings may be uncovered. The valve head 21 is made integral with a tubular stem 30 which extends downward into the chamber 4 and is secured at its lower end to a circular diaphragm 31 in the lower part of the storage chamber 4, so that on a downward movement of this diaphragm the fluid is forced up through the tubular part and through an opening through the valve, which will be hereinafter described, to supply the fluid to the receptacle above.

Referring now more particularly to the construction of the valve head 21 with its upwardly extending plunger 25, it will be seen that the plunger is separable from the valve head, being secured to the latter by a threaded connection indicated at 40. Through the center of the head 21 is made an opening having its lower edge formed as a valve and closed by a valve head 41 with its stem extending upward into a cylindric recess or opening in the center of the plunger 25 where the valve stem 42 is engaged by a spring 43 acting to press the valve upward and close the opening through the head 21. The center opening in the valve plunger 25 is continued upward, but reduced in diameter and communicates with a large cylindric opening 45 into the upper end of the plunger 25. A valve formed in the center opening through the valve plunger 25 above the upper end of the valve stem 42 is closed by a valve head 48, having a stem 49 which extends upward. The head 48 rests upon the upper end of the valve stem 42 so that a downward pressure upon the valve stem 49 to open the valve 48 will open both valves; but the valve 48 is independently closed by a spring 50 encircling the spring 43 so that in case the first valve should skip or otherwise fail in operation, the second valve 48 may be relied upon to close the opening into the storage chamber 4. It must be noted also that the lower valve will prevent the escape of liquid from the reservoir in case the upper valve should be rendered inoperative from heat due to the ignition of the small amount of liquid which may be in the funnel 10; while the upper valve will normally serve to prevent the escape of liquid in the tubular parts between the two valves when the device is inverted. A circular disk 60 with its edge upturned in the form of a small dish or saucer and having perforations 61 through it, is secured to the upper end of the valve stem 49, and is provided on its underside with a cylindric hub 63 which fits into the opening 45 in the upper end of the plunger 25. The upper end of the valve stem 49 is adjustably threaded into the lower part of the disk 60, the threaded opening being somewhat longer than necessary so that the stem 49 may be screwed in to any predetermined distance. It will be seen that by screwing such stem farther into such opening, the extent to which the valve 48 is lowered or opened will be decreased and likewise the movement of the valve stem 42 will also be decreased. Likewise by screwing the stem 49 farther down or out the extent to which the two valves will be opened will be increased. The openings 65 afford communication between the surface of the disk 60 and the cylindric chamber 45 below its hub. Other openings 66 through the wall of the small chamber 45 provide a means for escape of the excess of fluid which may enter this chamber as will be described hereinafter. Such openings 66, are made very close to the bottom of the cylindric chamber 45 in order to permit substantially all the liquid to drain therefrom. The downward movement of the disk 60 is limited by the contact of its underside with the upper edge or rim 46, of the plunger 25, the holes 66 remaining open and uncovered by the lower edge of the cylindric hub 63 when at its lowest point. Below the openings 66 and in that part of the valve plunger 25 which is normally above the center opening in the cylinder 12, are cut grooves 68 so that when the plunger 25 is down the fluid which escapes through the openings 66 and 61 into the funnel 10 may drain back through the fluting into the storage chamber 4.

Below the diaphragm 31 is arranged a large coil spring 70 acting to press the diaphragm upward, and through the diaphragm are made openings 71 for the passage of fluid from the upper side of the diaphragm to the lower side; the return passage of the fluid being prevented by check valves 72 made simply in the form of circular flaps or disks adapted to cover the undersides of the openings.

The operation of the device is as follows:

The storage chamber 4 is filled by pouring the liquid into the funnel 10 and pressing downward upon the disk 60 whereby the valve plunger 25 is pushed downward to open the passage-way through the hole 20 and the grooves 68, while at the same time the valves 41 and 48 are opened to permit the air to escape from the storage chamber. Thereafter in the use of the device a sponge or pad of cloth may be placed upon the disk 60 and pressed downward whereupon the first movement will open the valves 41 and 48 and a further downward movement of the disk will depress the plunger 25 and the diaphragm 31 to force the liquid up through the tube 30, the opening through the center of the plunger 25, and the openings 65 into the disk 60 to moisten the pad or sponge, while the excess of fluid in the chamber 45, which may be prevented from escaping through the openings 65 by the obstruction of the pad or sponge above them, escapes through the openings 66 into the funnel 10, and the excess of fluid in the disk 60 drains down through the openings 61 also into the funnel 10. Upon the pressure on the disk 60 being released, the springs 43 and 50 act to close the valves 41 and 48 and the spring 70 acts to close the valve 21, this movement, however, being relatively slower through the retarding effect of the liquid or vapor in the chamber 4 upon the diaphragm 31, so that during such movement time is afforded for the draining back into the storage chamber 4 through the grooves 68 and the openings 20 of whatever small amount of liquid in the lower part of the funnel 10 that has not immediately drained back through the relatively large area afforded by such openings. In such condition then the liquid in the storage chamber 4 is effectively sealed to prevent loss by evaporation and danger of fire if the liquid is inflammable where it is also protected by the air chamber between the disks 3 and 10 from fire above in case any amount of liquid in the funnel 10 should become ignited from any cause and it is likewise insulated against heat from below by the air chamber under the raised bottom 2, this air chamber being effective in case the receptacle is placed upon a hot stove or other heated surface as occasionally happens, particularly where a device of this nature is used in tailoring establishments.

I claim as my invention:

1. A storage and dispensing vessel comprising a receptacle separated by a partition into a lower storage chamber and an upper dispensing chamber, an additional partition in the upper part of the storage chamber to provide an air space between the two partitions and insulate the storage chamber against heat, a tube or passageway through the partitions to convey liquid from the storage chamber to the dispensing chamber, and valve structure controlling the discharge of liquid.

2. A storage and dispensing vessel comprising a receptacle separated by a partition into a lower storage chamber and an upper dispensing chamber, a passageway affording communication from the storage chamber to the dispensing chamber, a hollow movable plunger extending through such passageway, valves in the opening through such plunger, a dish-shaped disk on the top of such plunger, and openings in the bottom of such disk communicating with the hollow part of such plunger.

In witness whereof I have hereunto subscribed my name this 28th day of November, A. D. 1916.

SALVATORE LEO SISTI.

Copies of this patent may be obtained for five cents each, by addressing the "Commissioner of Patents, Washington, D. C."